(12) United States Patent
Yeh

(10) Patent No.: US 10,503,433 B2
(45) Date of Patent: Dec. 10, 2019

(54) MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

(*) Notice: Subject to any disclaimer, the term of this patent is extended or adjusted under 35 U.S.C. 154(b) by 110 days.

(21) Appl. No.: 14/854,059

(22) Filed: Sep. 15, 2015

(65) Prior Publication Data
US 2017/0052704 A1    Feb. 23, 2017

(30) Foreign Application Priority Data
Aug. 18, 2015   (TW) .............................. 104126901 A

(51) Int. Cl.
*G06F 12/02* (2006.01)
*G06F 3/06* (2006.01)

(52) U.S. Cl.
CPC .......... *G06F 3/0659* (2013.01); *G06F 3/0617* (2013.01); *G06F 3/0679* (2013.01); *G06F 12/02* (2013.01)

(58) Field of Classification Search
CPC ...................................................... G06F 12/02
USPC ......................................................... 711/103
See application file for complete search history.

(56) References Cited

U.S. PATENT DOCUMENTS

| 2011/0107042 | A1* | 5/2011 | Herron | G06F 3/0605 |
| | | | | 711/161 |
| 2012/0272123 | A1* | 10/2012 | Yeh | G06F 12/0246 |
| | | | | 714/773 |
| 2013/0159605 | A1* | 6/2013 | Lau | G06F 12/0246 |
| | | | | 711/103 |
| 2015/0179268 | A1* | 6/2015 | Kim | G11C 13/004 |
| | | | | 365/185.03 |

(Continued)

FOREIGN PATENT DOCUMENTS

TW    201040719    11/2010
TW    201128648    8/2011

OTHER PUBLICATIONS

"Office Action of Taiwan Counterpart Application", dated Jan. 21, 2016, p. 1-p. 8, in which the listed references were cited.

*Primary Examiner* — Gautam Sain
(74) *Attorney, Agent, or Firm* — JCIPRNET

(57) ABSTRACT

The disclosure provides a memory management method, which includes: selecting at least one logical unit mapped to physical units programmed based on a first operating mode; determining a reference count according to a number of the selected logical unit; receiving a first write command; determining whether the reference count is greater than a threshold value; if the reference count is greater than the threshold value, programming first data into a first physical unit based on the first operating mode, and each memory cell in the first physical unit stores a first number of bit data; if the reference count is not greater than the threshold value, programming the first data into a second physical unit based on a second operating mode, and each memory cell in the second physical unit stores a second number of bit data, and the second number is greater than the first number.

21 Claims, 8 Drawing Sheets

(56) References Cited

U.S. PATENT DOCUMENTS

| | | | |
|---|---|---|---|
| 2015/0213896 A1* | 7/2015 | Lieber | G06F 3/061 711/103 |
| 2015/0378613 A1* | 12/2015 | Koseki | G06F 3/0608 711/103 |
| 2016/0062667 A1* | 3/2016 | Samuels | G06F 3/0608 711/103 |

* cited by examiner

MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104126901, filed on Aug. 18, 2015. The entirety of the above-mentioned patent application is hereby incorporated by reference herein and made a part of this specification.

BACKGROUND

Technical Field

The disclosure relates to a memory management mechanism, and more particularly, to a memory management method, a memory control circuit unit and a memory storage device.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage device which utilizes a flash memory as its storage medium. For these reasons, the flash memory has become an import part of the electronic industries.

Based on memorable bits of each memory cell, a NAND-type flash memory may be classified into a Single Level Cell (SLC) NAND-type flash memory, a Multi Level Cell (MLC) NAND-type flash memory and a Trinary Level Cell (TLC) NAND-type flash memory. Therein, each memory cell of the SLC NAND-type flash memory is capable of storing one bit of data (i.e., "1" and "0"), each memory cell of the MLC NAND-type flash memory is capable of storing two bits of data, and each memory cell of the TLC NAND-type flash memory is capable of storing three bits of data.

In the NAND-type flash memory, physical programming units are constituted by a plurality of memory cells arranged in the same word line. Because each memory cell of the SLC NAND-type flash memory is capable of storing one bit of data, the memory cells arranged on the same word line are corresponding to one physical programming unit in the SLC NAND-type flash memory.

In comparison with the SLC NAND-type flash memory, a floating gate storage layer of each memory cell of the MLC NAND-type flash memory is capable of storing two bits of data. Therein, each storage status (i.e., "11", "10", "01" and "00") includes a Least Significant Bit (LSB) and a Most Significant Bit (MSB). For instance, in the storage status, a value of a first bit counted from the left is the LSB, and a value of a second bit counted from the left is the MSB. Accordingly, the memory cells arranged on the same word line can constitute two physical programming units. Herein, the physical programming unit constituted by the LSBs of said memory cells is known as a lower physical programming unit (or a lower physical page), and the physical programming unit constituted by the MSBs of said memory cells is known as an upper physical programming unit (or an upper physical page). Particularly, a writing speed of the lower physical programming unit is faster than a writing speed of the upper physical programming unit, and data stored in the lower physical programming unit may be lost due to errors occurred while programming the upper physical programming unit.

Similarly, each memory cell in the TLC NAND-type flash memory is capable of storing three bits of data, wherein each storage state (i.e., "111", "110", "101", "100", "011", "010", "001" and "000") includes a first bit counted from the left being the LSB, a second bit counted from the left being a CSB (Center Significant Bit) and a third bit counted from the left being the MSB. Accordingly, the memory cells arranged on the same word line can constitute three physical programming units. Herein, the physical programming units constituted by the LSBs of said memory cells are known as the lower physical programming unit, the physical programming units constituted by the CSBs of said memory cells are known as a center physical programming unit, and the physical programming units constituted by the MSBs of said memory cells are known as the upper physical programming unit. Particularly, while programming memory cells arranged on the same word line, the stored data may be lost unless only the lower physical programming unit is programmed, or the lower physical programming unit, the center physical programming unit and the upper physical programming unit are all simultaneously programmed.

Because an access speed of the lower physical programming unit is faster than that of the upper physical programming unit in the MLC NAND-type flash memory, if only the lower physical programming units are used to store data (also known as a single-page mode), an access speed of the MLC NAND-type flash memory may be improved, but a data mount of the MLC NAND-type flash memory will become a half a data volume stored by using both the lower physical programming units and the upper physical programming units. Moreover, if the single-page mode is over-used to access the data, the stored data volume will reach a half of the available volume of the flash memory, such that the writing speed may suddenly drop since a garbage collection operation due to insufficient storage space must be performed in order to release more space for storing new data.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure is directed to a memory management method, a memory control circuit unit and a memory storage device, which are capable of reducing the problem of sudden dropping of the writing speed caused by a large amount of garbage collection operations performed after a size of the write data reaches a half of the memory storage device while no limitation is set for the size of data written into the physical units based on the single-page mode.

An exemplary embodiment of the disclosure provides a memory management method for a rewritable non-volatile memory module having a plurality of physical units. The memory management method includes: selecting at least one logical unit meeting a first condition, wherein the at least one logical unit meeting the first condition is mapped to at least one third physical unit among the physical units, and each memory cell of the at least one third physical unit is configured to store a first number of bit data and programmed based on a first operating mode; determining a reference count according to a number of the selected logical unit; receiving a first write command; determining whether the reference count is greater than a threshold value; if the reference count is greater than the threshold value, programming first data corresponding to the first write command into at least one first physical unit among the physical units based on the first operating mode, wherein each memory cell in the at least one first physical unit is configured to store the first number of bit data; if the reference count is not greater than the threshold value, programming the first data into at least one second physical unit among the physical units based on a second operating mode, wherein each memory cell of the at least one second physical unit is configured to store a second number of bit data, wherein the second number is greater than the first number.

An exemplary embodiment of the disclosure provides a memory control circuit unit for controlling a rewritable non-volatile memory module. The memory control circuit unit includes a host interface, a memory interface and a memory management circuit. The host interface is configured to couple to a host system. The memory interface is configured to couple to the rewritable non-volatile memory module, and the rewritable non-volatile memory module includes a plurality of physical units. The memory management circuit is coupled to the host interface and the memory interface. The memory management circuit is configured to select at least one logical unit meeting a first condition. The at least one logical unit meeting the first condition is mapped to at least one third physical unit among the physical units, and each memory cell of the at least one third physical unit is configured to store a first number of bit data and programmed based on a first operating mode. The memory management circuit is further configured to determine a reference count according to a number of the selected logical unit. The memory management circuit is further configured to receive a first write command. The memory management circuit is further configured to determine whether the reference count is greater than a threshold value. If the reference count is greater than the threshold value, the memory management circuit instructs to program first data corresponding to the first write command into at least one first physical unit among the physical units based on the first operating mode. Each memory cell of the at least one first physical unit is configured to store the first number of bit data. If the reference count is not greater than the threshold value, the memory management circuit instructs to program the first data into at least one second physical unit among the physical units based on a second operating mode. Each memory cell of the at least one second physical unit is configured to store a second number of bit data. The second number is greater than the first number.

An exemplary embodiment of the disclosure provides a memory storage device, which includes a connection interface unit, a rewritable non-volatile memory module and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to select at least one logical unit meeting a first condition. The at least one logical unit meeting the first condition is mapped to at least one third physical unit among the physical units, and each memory cell of the at least one third physical unit is configured to store a first number of bit data and programmed based on a first operating mode. The memory control circuit unit is further configured to determine a reference count according to a number of the selected logical unit. The memory control circuit unit is further configured to receive a first write command. The memory control circuit unit is further configured to determine whether the reference count is greater than a threshold value. If the reference count is greater than the threshold value, the memory control circuit unit instructs to program first data corresponding to the first write command into at least one first physical unit among the physical units based on the first operating mode. Each memory cell of the at least one first physical unit is configured to store the first number of bit data. If the reference count is not greater than the threshold value, the memory control circuit unit instructs to program the first data into at least one second physical unit among the physical units based on a second operating mode. Each memory cell of the at least one second physical unit is configured to store a second number of bit data. The second number is greater than the first number.

Based on the above, according to the memory management method, the memory control circuit unit and the memory storage device provided by the disclosure, first data is programmed into the first physical unit based on the first operating mode only when the reference count is greater than the threshold value. Accordingly, the problem of sudden dropping of the writing speed caused by the first operating mode overused to write data into the physical unit may be reduced, and the data merging procedure may be optimized because of the reference count.

To make the above features and advantages of the present disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
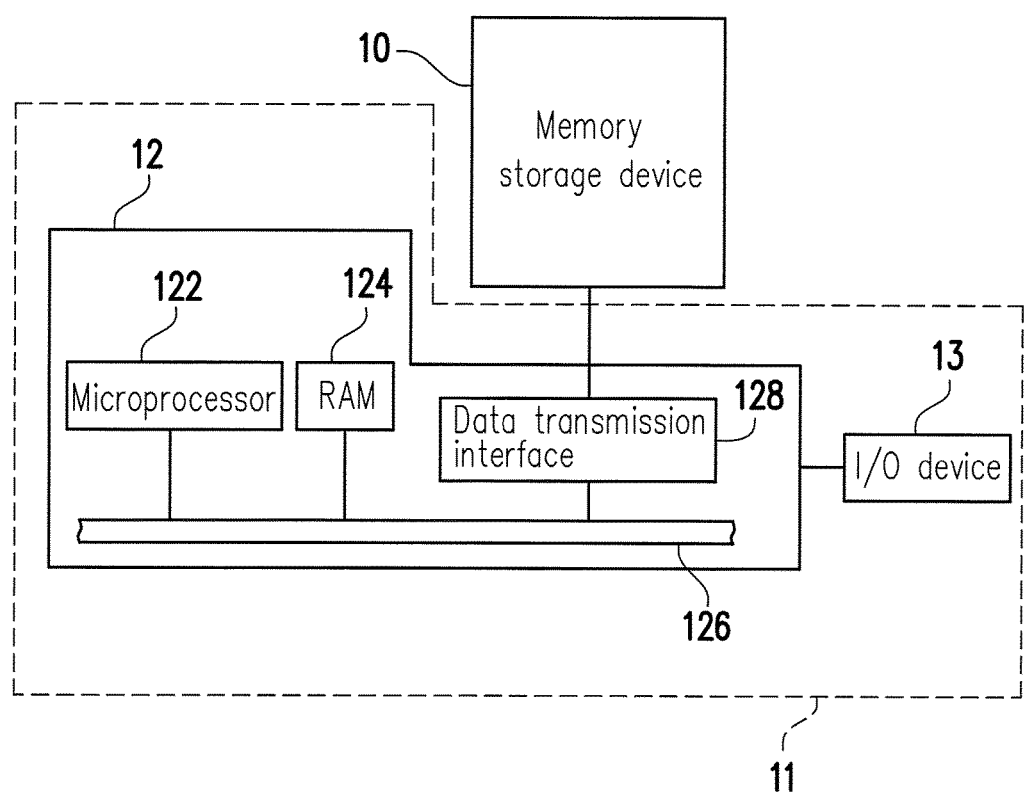
FIG. 1 is a schematic diagram illustrating a host system and a memory storage device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, the memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
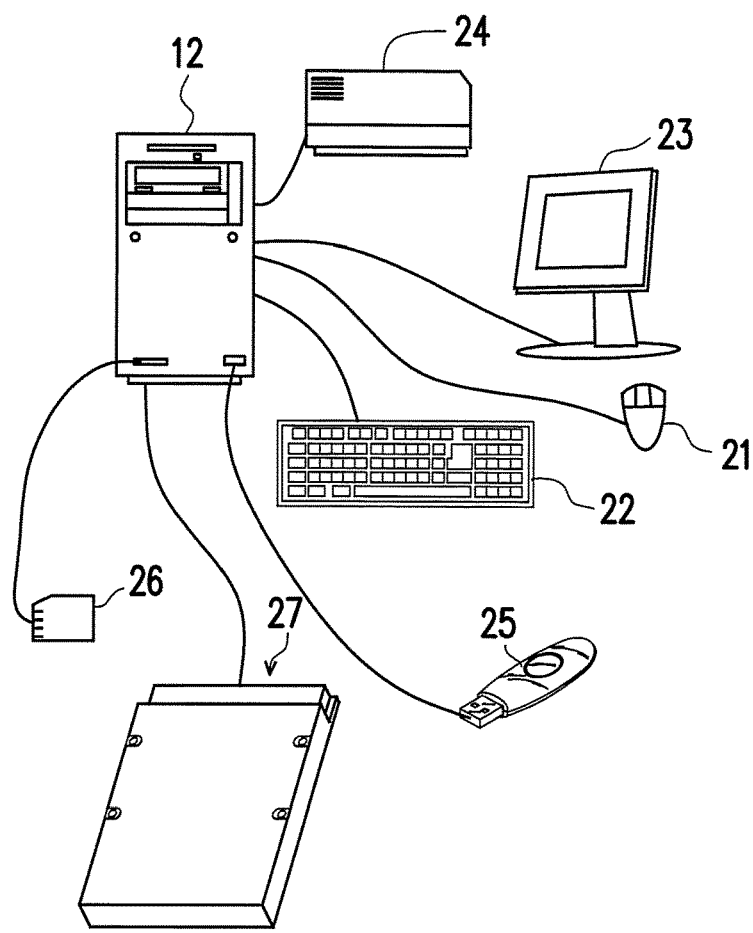
FIG. 2 is a schematic diagram of a computer, an input/output device, and a memory storage device according to an exemplary embodiment of the disclosure.

FIG. 1 is a schematic diagram illustrating a host system and a memory storage device according to an exemplary embodiment of the disclosure. FIG. 2 is a schematic diagram of a computer, an input/output device, and a memory storage device according to an exemplary embodiment of the disclosure.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In an exemplary embodiment, the memory storage device 10 is coupled to other devices of the host system 11 through the data transmission interface 128. By using the microprocessor 122, the random access memory 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
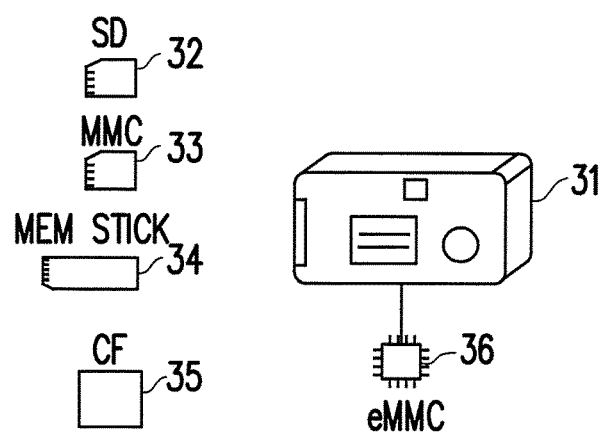
FIG. 3 is a schematic diagram illustrating a host system and a memory storage device according to an exemplary embodiment of the disclosure.

FIG. 3 is a schematic diagram illustrating a host system and a memory storage device according to an exemplary embodiment of the disclosure.

Generally, the host system 11 may substantially be any system capable of storing data with the memory storage device 10. Even though the host system 11 is illustrated as a computer system in the present exemplary embodiment, however, in another exemplary embodiment of the present disclosure, the host system 11 may be a digital camera, a video camera, a telecommunication device, an audio player, or a video player. For example, when the host system is a digital camera (video camera) 31, the rewritable non-volatile memory storage device may be a SD card 32, a MMC card 33, a memory stick 34, a CF card 35 or an embedded storage device 36 (as shown by FIG. 3). The embedded storage device 36 includes an embedded MMC (eMMC). It should be mentioned that the eMMC is directly coupled to a substrate of the host system.

Figure 4:
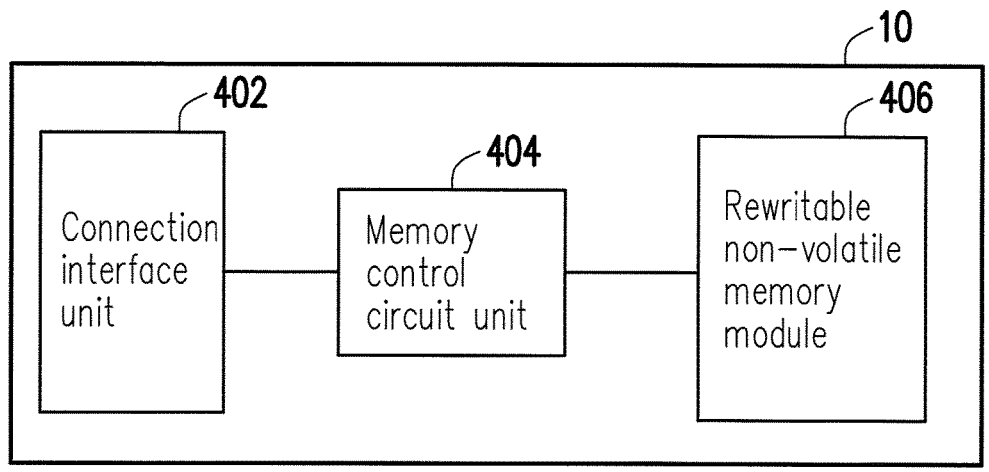
FIG. 4 is a schematic block diagram illustrating the memory storage device depicted in FIG. 1.

FIG. 4 is a schematic block diagram illustrating the memory storage device depicted in FIG. 1.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the disclosure is not limited thereto, and the connection interface unit 402 may also be compatible to a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory stick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a Single Level Cell (SLC) NAND flash memory module (i.e., a flash memory module capable of storing one bit data in one memory cell), a Multi Level Cell (MLC) NAND flash memory module (i.e., a flash memory module capable of storing two bit data in one memory cell), a Triple Level Cell (TLC) NAND flash memory module (i.e., a flash memory module capable of storing three bit data in one memory cell), other flash memory modules or any memory module having the same features.

Figure 5:
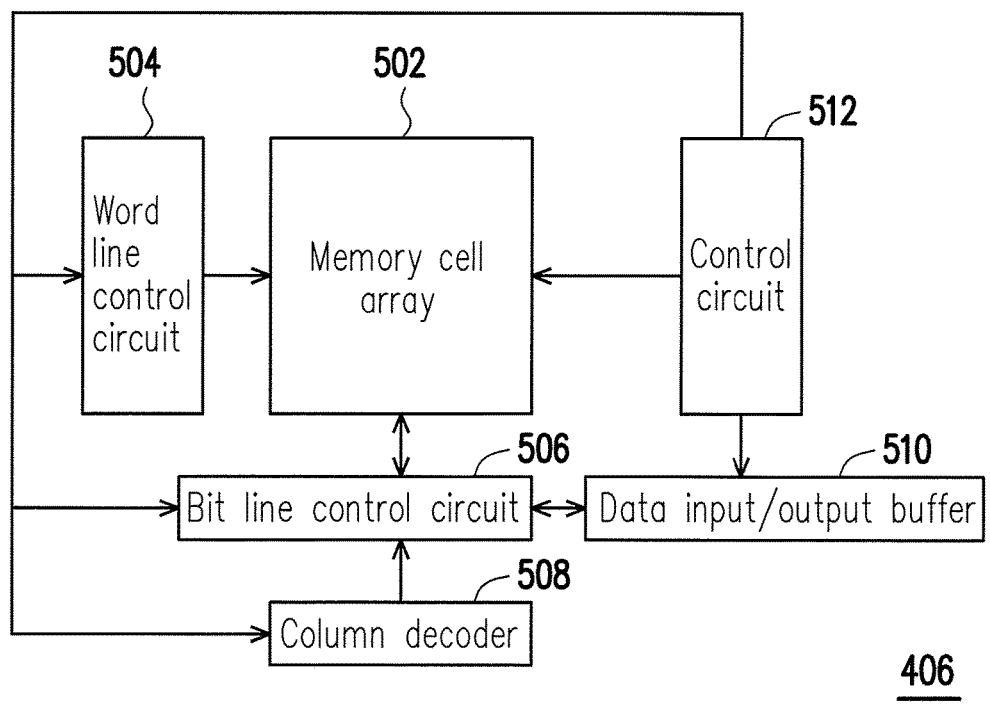
FIG. 5 is a schematic block diagram illustrating a rewritable non-volatile memory module according to an exemplary embodiment of the disclosure.
Figure 6:
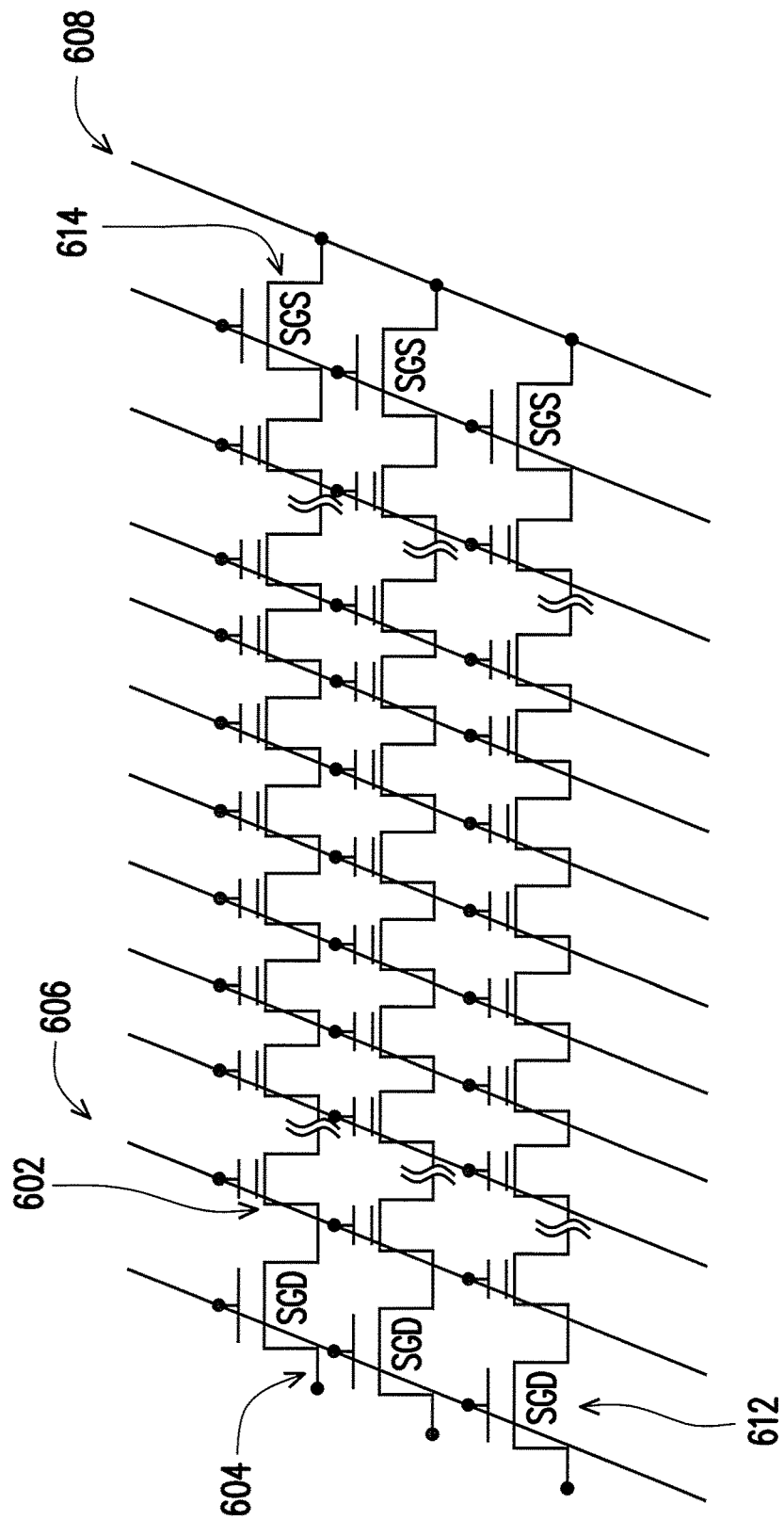
FIG. 6 is a schematic diagram illustrating a memory cell array according to an exemplary embodiment of the disclosure.

FIG. 5 is a schematic block diagram illustrating a rewritable non-volatile memory module according to an exemplary embodiment of the disclosure. FIG. 6 is a schematic diagram illustrating a memory cell array according to an exemplary embodiment of the disclosure.

Referring to FIG. 5, the rewritable non-volatile memory module 406 includes a memory cell array 502, a word line control circuit 504, a bit line control circuit 506, a column decoder 508, a data input-output buffer 510 and a control circuit 512.

In the present exemplary embodiment, the memory cell array 502 may include a plurality of memory cells 602 used to store data, a plurality of select gate drain (SGD) transistors 612, a plurality of select gate source (SGS) transistors 614, as well as a plurality of bit lines 604, a plurality of word lines 606, a common source line 608 connected to the memory cells (as shown in FIG. 6). The memory cell 602 is disposed at intersections of the bit lines 604 and the word lines 606 in a matrix manner (or in a 3D stacking manner). When a write command or a read command is received from the memory control circuit unit 404, the control circuit 512 controls the word line control circuit 504, the bit line control circuit 506, the column decoder 508, the data input-output buffer 510 to write the data into the memory cell array 502 or read the data from the memory cell array 502, wherein the word line control circuit 504 is configured to control voltages applied to the word lines 606, the bit line control circuit 506 is configured to control voltages applied to the bit lines 604, the column decoder 508 is configured to select the corresponding bit line according to a row address in a command, and the data input/output buffer 510 is configured to temporarily store the data.

Each of the memory cells in the rewritable non-volatile memory module 406 may store one or more bits by changing a threshold voltage of the memory cell. More specifically, in each of the memory cells, a charge trapping layer is provided between a control gate and a channel. Amount of electrons in the charge trapping layer may be changed by applying a write voltage to the control gate thereby changing the threshold voltage of the memory cell. This process of changing the threshold voltage is also known as "writing data into the memory cell" or "programming the memory cell". Each of the memory cells in the memory cell array 502 has a plurality of storage statuses depended on changes in the threshold voltage. Moreover, which of the storage statuses is the memory cell belongs to may be determined by read voltages, so as to obtain the one or more bits stored in the memory cell.

Figure 7:
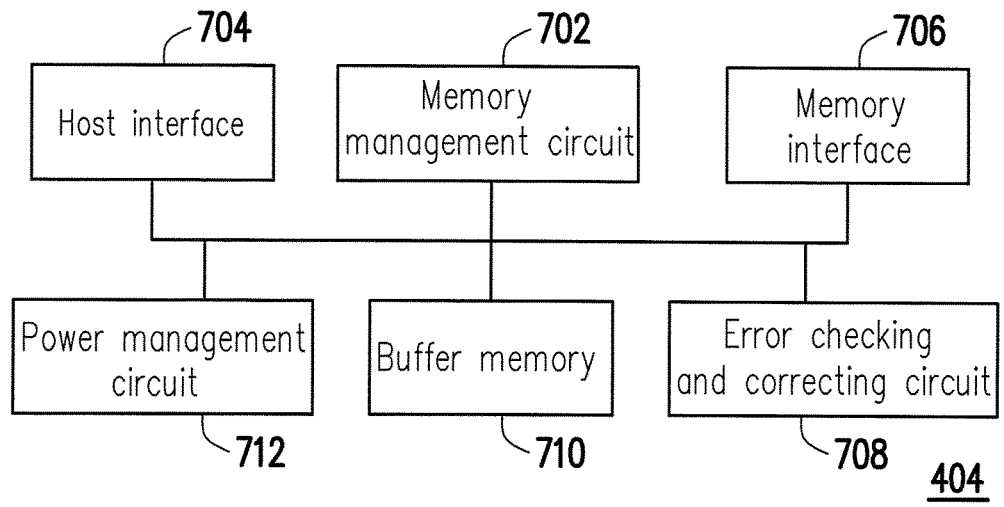
FIG. 7 is a schematic block diagram illustrating a memory control circuit unit according to an exemplary embodiment of the disclosure.

FIG. 7 is a schematic block diagram illustrating a memory control circuit unit according to an exemplary embodiment of the disclosure.

Referring to FIG. 7, the memory control circuit unit 404 includes a memory management circuit 702, a host interface 704 and a memory interface 706.

The memory management circuit 702 is configured to control overall operations of the memory control circuit unit 404. Specifically, the memory management circuit 702 has a plurality of control commands. During operations of the memory storage device 10, the control commands are executed to execute various operations such as writing, reading and erasing data. Hereinafter, operations of the memory management circuit 702 are described as equivalent to describe operations of the memory control circuit unit 404.

In the present exemplary embodiment, the control commands of the memory management circuit 702 are implemented in form of firmware. For instance, the memory management circuit 702 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 702 may also be stored as program codes in a specific area (for example, the system area in a memory exclusively used for storing system data) of the rewritable non-volatile memory module 406. In addition, the memory management circuit 702 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 702 when the memory control circuit unit 404 is enabled. Thereafter, the control commands are executed by the microprocessor unit to execute operations of writing, reading or erasing data.

Further, in another exemplary embodiment, the control commands of the memory management circuit 702 may also be implemented in a form of hardware. For example, the memory management circuit 702 includes a microprocessor, a physical unit management circuit, a memory writing circuit, a memory reading circuit, a memory erasing circuit and a data processing circuit. The physical unit management circuit, the memory writing circuit, the memory reading circuit, the memory erasing circuit and the data processing circuit are coupled to the microprocessor. The physical unit management circuit is configured to manage physical units of the rewritable non-volatile memory module 406; the memory writing circuit is configured to issue a write command sequence to the rewritable non-volatile memory module 406 in order to write data into the rewritable non-volatile memory module 406; the memory reading circuit is configured to issue a read command sequence to the rewritable non-volatile memory module 406 in order to read data from the rewritable non-volatile memory module 406; the memory erasing circuit is configured to issue an erase command sequence to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406. Each of the write command sequence, the read command sequence and the erase command sequence may include one or more program codes or command codes, respectively, and instruct the rewritable non-volatile memory module 406 to perform the corresponding operations, such as writing, reading and erasing.

The host interface 704 is coupled to the memory management circuit 702 and configured to receive and identify commands and data sent from the host system 11. In other words, the commands and data sent from the host system 11 are passed to the memory management circuit 702 through the host interface 704. In the present exemplary embodiment, the host interface 704 is compatible with the SATA standard. However, it should be understood that the present disclosure is not limited thereto, and the host interface 704 may also be compatible with a PATA standard, an IEEE 1394 standard, a PCI Express standard, a USB standard, a SD standard, a UHS-I standard, a UHS-II standard, a MS standard, a MMC standard, a eMMC standard, a UFS standard, a CF standard, an IDE standard, or other suitable standards for data transmission.

The memory interface 706 is coupled to the memory management circuit 702 and configured to access the rewritable non-volatile memory module 406. That is, data to be written to the rewritable non-volatile memory module 406 is converted to a format acceptable to the rewritable non-volatile memory module 406 through the memory interface 706. Specifically, if the memory management circuit 702 intends to access the rewritable non-volatile memory module 406, the memory interface 706 sends corresponding command sequences. For example, the command sequences may include the write command sequence which instructs to write data, the read command sequence which instructs to read data, the erase command sequence which instructs to erase data, and other corresponding command sequences configured to instruct performing various memory operations (e.g., for changing read voltage levels or performing a data merging procedure). Detailed descriptions regarding the above are omitted herein. These command sequences are generated by the memory management circuit 702 and transmitted to the rewritable non-volatile memory module 406 through the memory interface 706, for example. The command sequences may include one or more signals, or data stored in the bus. The signals or the data may include command codes and programming codes. For example, in a read command sequence, information such as identification codes and memory addresses are included.

In an exemplary embodiment, the memory control circuit unit 404 further includes an error checking and correcting circuit 708, a buffer memory 710 and a power management circuit 712.

The error checking and correcting circuit 708 is coupled to the memory management circuit 702 and configured to execute an error checking and correcting process to ensure the correctness of data. Specifically, when the memory management circuit 702 receives the write command from the host system 11, the error checking and correcting circuit 708 generates an error correcting code (ECC) and/or an error detecting code (EDC) for data corresponding to the write command, and the memory management circuit 702 writes data and the ECC and/or the EDC corresponding to the write command to the rewritable non-volatile memory module 406. Later, when the memory management circuit 702 reads the data from the rewritable non-volatile memory module 406, the corresponding ECC and/or the EDC are also read, and the error checking and correcting circuit 708 executes the error checking and correcting procedure on the read data based on the ECC and/or the EDC.

The buffer memory 710 is coupled to the memory management circuit 702 and configured to temporarily store data and commands from the host system 11 or data from the rewritable non-volatile memory module 406.

The power management unit 712 is coupled to the memory management circuit 702 and configured to control a power of the memory storage device 10.

Figure 8:
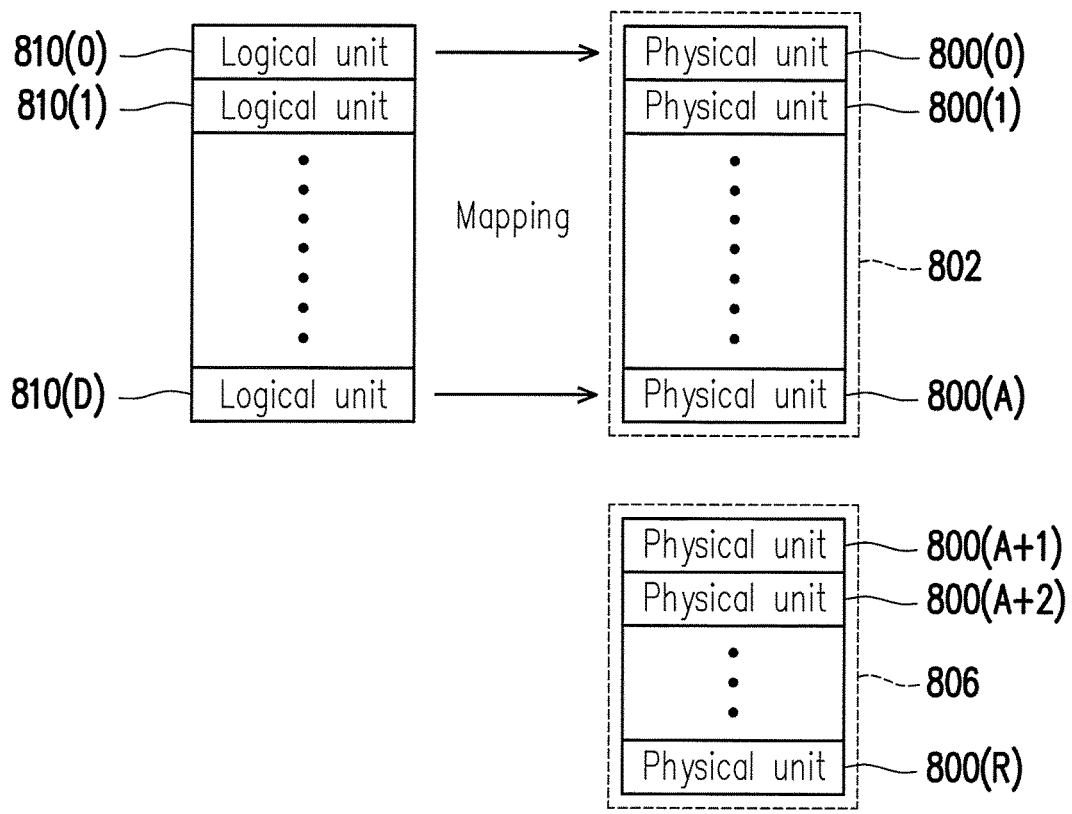
FIG. 8 is a schematic diagram illustrating management of a rewritable non-volatile memory module according to an exemplary embodiment of the disclosure.

FIG. 8 is a schematic diagram illustrating management of a rewritable non-volatile memory module according to an exemplary embodiment of the disclosure. It should be understood that terms, such as "select", "group", "divide", "associate" and so forth, are logical concepts which describe operations in the physical units of the rewritable non-volatile memory module 406. That is, the physical units of the rewritable non-volatile memory module are logically operated, but actual positions of the physical units of the rewritable non-volatile memory module are not changed.

The memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store more than two bits, the physical programming units on the same word line can be at least classified into a lower physical programming unit and an upper physical programming unit. For instance, in the MLC NAND-type flash memory, a least significant bit (LSB) of one memory cell belongs to the lower physical programming unit, and a most significant bit (MSB) of one memory cell belongs to the upper physical programming unit. Generally, a writing speed of the lower physical programming unit is faster than a writing speed of the upper physical programming unit, or a reliability of the lower physical programming unit is higher than a reliability of the upper physical programming unit.

In the present exemplary embodiment, the physical programming unit is a minimum unit for programming. That is, the programming unit is the minimum unit for writing data. For example, the physical programming unit is a physical page or a physical sector. When the physical programming unit is the physical page, each physical programming unit usually includes a data bit area and a redundancy bit area. The data bit area has multiple physical sectors configured to store user data, and the redundant bit area is configured to store system data (e.g., an error correcting code). In the present exemplary embodiment, the data bit area contains 32 physical sectors, and a size of each physical sector is 512-byte (B). However, in other exemplary embodiments, the data bit area may also include 8, 16 physical sectors or different number (more or less) of the physical sectors, and the size of each physical sector may also be greater or smaller. On the other hand, the physical erasing unit is the minimal unit for erasing. Namely, each physical erasing unit contains the least number of memory cells to be erased together. For instance, the physical erasing unit is a physical block.

Referring to FIG. 8, the memory management circuit 702 can logically group the physical units 800(0) to 800(R) of the rewritable non-volatile memory module 406 into a plurality of areas such as a storage area 802 and a system area 806.

The physical units in the storage area 802 are configured to store data from the host system 11. The storage area 802 stores valid data and invalid data. For example, when the host system intends to delete one valid data, the data being deleted may still be stored in the storage area 802 but marked as the invalid data. In the following exemplary embodiment, the physical unit not storing the valid data is also known as a spare physical unit. For example, the physical unit being erased becomes the spare physical unit. Further, in the following exemplary embodiment, the physical unit storing the valid data is also known as a non-spare physical unit.

In an exemplary embodiment, if there are damaged physical units in the storage area 802 or the system area 806, the physical units in the storage area 802 may also be used to replace the damaged physical units. If there are no available physical units in the storage area 802 for replacing the damaged physical units, the memory management circuit 702 can announce that the memory storage device 10 is in a write protect status, so that data can no longer be written thereto.

The physical units in the system area 806 are configured to record system information including information related to manufacturer and model of a memory chip, a number of physical erasing units in the memory chip, a number of the physical programming unit in each physical erasing unit, and so forth.

In an exemplary embodiment, numbers of the physical units in the storage area 802 and the system area 806 may be different based on different memory specifications. In addition, it should be understood that, during operations of the memory storage device 10, grouping relations of the physical units associated to the storage area 802 and the system area 806 may be dynamically changed. For example, when damaged physical units in the system area 806 are replaced by the physical units in the storage area 802, the physical units originally from the storage area 802 are then associated to the system area 806.

In the present exemplary embodiment, the memory management circuit 702 configures logical units 810(0) to 810(D) for mapping the physical units 800(0) to 800(A) in the storage area 802. For example, in the present exemplary embodiment, the host system 11 accesses the data stored in the storage area 802 through logical addresses. Therefore, each of the logical units 810(0) to 810(D) refers to one logical address. In addition, in another exemplary embodiment, each of the logical units 810(0) 810(D) may also refer to one logical sector, one logical page, one logical erasing unit and a composition of a plurality of continuous or discontinuous logical addresses.

In the present exemplary embodiment, each of the logical units 810(0) to 810(D) maps to one or more physical units. Each of the physical units may refer to one physical programming unit, one physical erasing unit or a composition of a plurality of continuous or discontinuous physical addresses. The memory management circuit 702 records mapping relations between the logical units and the physical units into at least one logical-to-physical mapping table. When the host system 11 intends to read the data from the memory storage device 10 or write the data into the memory storage device 10, the memory management circuit 702 may access the data in the memory storage device 10 according to the logical-to-physical mapping table.

In the present embodiment, taking the rewritable non-volatile memory module as the MLC NAND-type flash memory as an example, the memory management circuit 702 can use a single-page mode (hereinafter, also known as a first operating mode) or a multi-page mode (hereinafter, also known as a second operating mode) to operate any one of the physical units in the rewritable non-volatile memory module 406. Each memory cell in the physical unit operated based on the first operating mode only stores one bit data (i.e., a first number of bit data). That is, the physical unit operated based on the first operating mode only uses the lower physical programming units to store data. Each memory cell in the physical unit operated based on the second operating mode only stores two bit data (i.e., a second number of bit data). That is, the physical unit operated based on the second operating mode can use both the lower physical programming units and the upper physical programming units to store data.

Figure 9A:
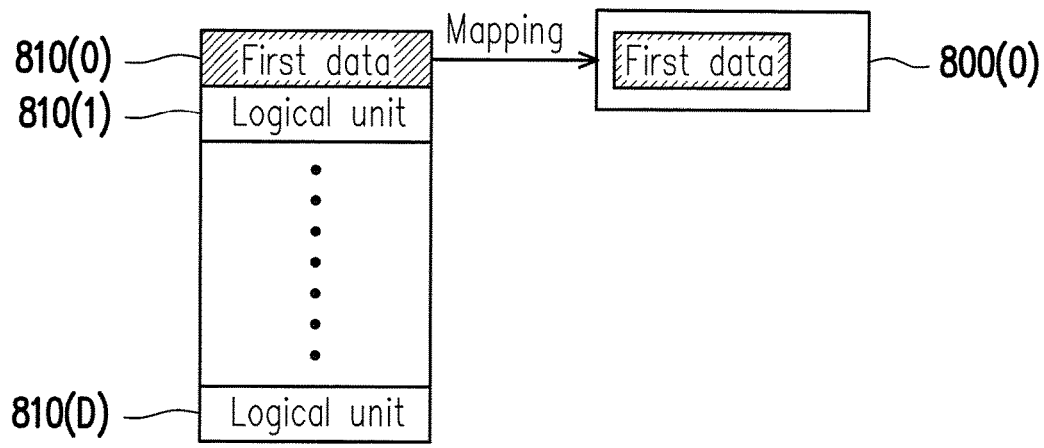
FIG. 9A and FIG. 9B are schematic diagrams illustrating a memory management method according to an exemplary embodiment of the disclosure.
Figure 9B:
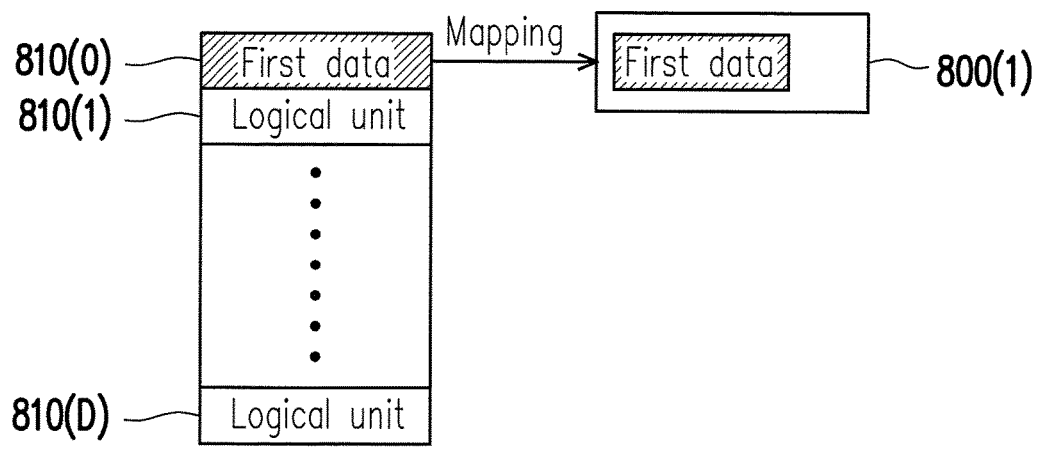

FIG. 9A and FIG. 9B are schematic diagrams illustrating a memory management method according to an exemplary embodiment of the disclosure.

First of all, the memory management circuit 702 determines an initial value of a reference count according to a difference value between a total logical volume of the rewritable non-volatile memory module 406 and a total physical volume of the rewritable non-volatile memory module 406. Specifically, the total logical volume of the rewritable non-volatile memory module 406 refers to a total logical volume of the logical units 810(0) to 810(D), and the total physical volume of the rewritable non-volatile memory module 406 refers to a total physical volume of the physical units 800(0) to 800(A). The memory management circuit 702 determines the initial value of the reference count according to the difference value obtained by subtracting the total logical volume from the total physical volume. The initial value represents a maximum value of a logical data volume that can be written into the physical units based on the first operating mode. After the memory management circuit 702 writes data corresponding to the logical units into the physical units based on the first operating mode, the reference count is equal to the initial value minus the logical data volume of data already written into physical units based on the first operating mode. Herein, the logical data volume is a total data volume of all data stored in the logical units. In other words, the reference count represents logical data volume that can still be written into the physical units based on the first operating mode after the memory management circuit 702 has used the first operating mode to write some logical data into the physical units. Hereinafter, the reference count is represented by N.

It should be noted that, while calculating for N, a logical erasing unit, a logical programming unit, a logical sector or a logical address may be used as a minimal unit of N. For instance, it is assumed that the rewritable non-volatile memory module 406 has 120 logical units and 128 physical units. In the present exemplary embodiment, for illustrative convenience, it is assumed that the logical units are the logical erasing units each including 256 logical programming units, and it is also assumed that the physical units are the physical erasing units each including 256 physical programming units. In the present exemplary embodiment, the initial value of N is corresponding to a logical volume of 8 (128−120=8) logical erasing units. For example, if the logical erasing unit is used as the minimal unit of N, the initial value of N is 8; and if the logical programming unit is used as the minimal unit of N, the initial value of N is 2048 (8*256=2048).

Referring to FIG. 9A, it is assumed that no logical data is currently written into the physical unit based on the first operating mode, so that N is equal to the initial value at the time. When the memory management circuit 702 receives a write command (hereinafter, also known as a first write command) from the host system 11, the memory management circuit 702 stores write data (hereinafter, also known as first data) corresponding to the first write command into one logical unit (e.g., logical unit 810(0)) according to the first write command. After storing the first data into the logical unit 810(0), the memory management circuit 702 determines whether N is greater than a threshold value. Herein, the threshold value is set to 0, and N being greater than the threshold value indicates that the logical data volume currently stored in the logic units mapped to the physical units operated by the first operating mode has not reach the initial value of N.

If N is greater than threshold value, the memory management circuit 702 instructs the rewritable non-volatile memory module 406 to write the first data into one physical unit based on the first operating mode. For example, the memory management circuit 702 maps the logical unit 810(0) to the physical unit 800(0) and instructs the rewritable non-volatile memory module 406 to write the first data into the physical unit 800(0) based on the first operating mode. At this time, because data in the physical unit 800(0) mapped to the logical unit 810(0) is written based on the first operating mode, the logical unit 810(0) is regarded as the logical unit meeting a first condition.

If N is not greater than the threshold value (i.e., N=0), it indicates that the logical data volume written into the physical units based on the first operating mode has reach the initial value of N, and thus, the memory management circuit 702 writes the first data into one physical unit based on the second operating mode. For example, the memory management circuit 702 maps the logical unit 810(0) to the physical unit 800(1) and writes the first data into the physical unit 800(1) by using the second operating mode, as shown in FIG. 9B.

The foregoing exemplary embodiments has described that, while writing data into the physical units, the memory management circuit 702 determines whether to write the data into the physical units based on the first operating mode or the second operating mode according to whether N is greater than or not greater than the threshold value.

In an exemplary embodiment, the memory management circuit 702 selects at least one logical unit meeting the first condition, and determines N according to a number of the selected logical unit. For example, in the present exemplary embodiment, only the logical unit 810(0) is the logical unit meeting the first condition. Therefore, the memory management circuit 702 selects the logical unit 810(0) and determines N according to the selected logical unit 810(0). Herein, a size of the N is negatively correlated to the number of the logical unit meeting the first condition. In FIG. 9A, because the logical data having a volume of the logical unit 810(0) has been written into the physical unit 800(0) based on the first operating mode so the logical data volume that can still be used for writing data into the physical unit based on the first operating mode is reduced, the memory management circuit 702 adjusts N into N minus a volume of the logical unit 810(0) according to the volume of the logical unit 810(0). In other words, N is also negatively correlated to a data volume of valid data written based on the first operating mode. As another example, in FIG. 9B, after writing the first data into the physical unit 800(1), the logical data volume written into the physical unit based on the first operating mode does not change. That is, because a total number of the logical units mapped to the physical units storing the data programmed by using the first operating mode does not change (the number of the logical unit meeting the first condition does not change), the value of N does not change either.

On the other hand, when the memory management circuit 702 receives a command instructing to delete data stored in one specific logical unit, the memory management circuit 702 first determines whether the physical unit mapped to the logical unit is programmed based on the first operating mode or the second operating mode. If the physical unit mapped to the logical unit is programmed based on the first operating mode, the memory management circuit 702 sets the data in the physical unit mapped to the logical unit as the invalid data and deletes the data in such logical unit; and the memory management circuit 702 adjusts N into N plus the volume of the logical unit since the logical data volume that can be written into the physical units based on the first operating mode is increased. If the physical unit mapped to the logical unit is programmed base on the second operating mode, the memory management circuit 702 sets the data in the physical unit mapped to the logical unit as the invalid data and deletes the data in such logical unit; but, the value of N does not change since the logical data volume that can be written into the physical units by using the first operating mode does not change.

It should be noted that, in an exemplary embodiment, the memory management circuit 702 perform is a data merging procedure for the rewritable non-volatile memory module 406. For example, the data merging procedure can be performed when the rewritable non-volatile memory module 406 is in an idle state or at any time-point. In the data merging procedure, the memory management circuit 702 retrieves the valid data from at least one physical unit, collects the valid data into another physical unit, and erases the physical unit in which the valid data are all retrieved. For example, the memory management circuit 702 can locate the physical unit having a part of the volume storing the valid data (hereinafter, also known as second data) and a remaining part of the volume storing the invalid data from the rewritable non-volatile memory module 406, and determines whether the second data is programmed based on the first operating mode or the second operating mode. If the second data is programmed based on the first operating mode, the memory management circuit 702 moves the second data to another physical unit for storage (i.e., the second data is programmed into another physical unit by using the first operating mode), and erases the physical unit originally storing the second data. In other words, in the data merging procedure according to an exemplary embodiment, the memory management circuit 702 selects the valid data programmed based on the first operating mode from the physical units for the data merging procedure. It is assumed herein that one second data is moved from one physical erasing unit to one specific physical programming unit by the data merging procedure, and the physical erasing unit is then erased. In this case, the value of N is a first value before the data merging procedure is performed, and the value of N is adjusted into a second value by the memory management circuit 702 after the data merging procedure is performed. Herein, the second value is corresponding to the first value plus the volume of the erased physical erasing unit and minus the volume of the physical programming unit storing the second data, and thus, the second value is greater than the first value. If the second data is programmed based on the second operating mode, the memory management circuit 702 will not move the second data. However, in another data merging procedure, if the second data is programmed based on the second operating mode, it is also possible that the second data may be moved.

It should be noted that, in the present exemplary embodiment, as compared to the common data merging procedure that directly performs the data merging operation for the physical unit having the least valid data volume, the data merging procedure of the present exemplary embodiment only performs the data merging operation after confirming that the physical unit is operated based on the first operating mode. Further, the above steps may be performed together with the step of locating the physical unit having the least valid data volume. For example, if the memory management circuit 702 locates one physical unit having the least valid data volume yet the physical unit is operated based on the second operating mode, the memory management circuit 702 may not perform the data merging procedure for the physical unit but locates the physical unit having the second least valid data volume and operated based on the first operating mode for the data merging procedure.

FIG. 10A to FIG. 10D are schematic diagrams illustrating a memory management method according to another embodiment of the disclosure.

Before writing data from the logical unit into the physical unit, the memory management circuit 702 can compress the data of the logical unit first and then write the compressed data into the physical unit. For clear description, it is assumed herein that the memory management circuit 702 can compress the data by using following four compression resolutions: 1 k, 2 k, 3 k and 4 k. Herein, the 1 k compression resolution is capable of compressing each 4 KB of data into 1 KB (i.e., the data is compressed into ¼ size of the data before compression); the 2 k compression resolution is capable of compressing each 4 KB of data into 2 KB (i.e., the data is compressed into ½ size of the data before compression); the 3 k compression resolution is capable of compressing each 4 KB of data into 3 KB (i.e., the data is compressed into ¾ size of the data before compression); and the 4 k compression resolution means that the data is not compressed.

In an exemplary embodiment, the memory management circuit 702 adjusts N according to the number of the logical units mapped to the physical unit operated based on the first operating mode and whether the data stored in the physical unit operated based on the first operating mode is compressed, and/or adjusts N according to whether the data stored in the physical unit operated based on the second operating mode is compressed. For example, the memory management circuit 702 determines whether data to be written from the logical unit into the physical unit is compressed. If the data to be written from the logical unit into the physical unit is not compressed, the method of adjusting N can refer to related description of FIG. 9A and FIG. 9B, which is not repeated hereinafter. If the data to be written from the logical unit into the physical unit is compressed, the memory management circuit 702 further determines the compression resolution. For example, whether compression resolution is 2 k or 1 k is determined so that N can be adjusted accordingly. After the memory management circuit 702 compresses the data to be written into the physical unit and to be operated by the first operating mode and writes the compressed data into the physical unit based on the first operating mode, N may remain unchanged or increase. After the memory management circuit 702 compresses the data to be written into the physical unit and to be operated by the second operating mode and writes the compressed data into the physical unit based on the second operating mode, N may also remain unchanged or increase. In other words, if the data stored in the physical unit operated by the first operating mode is compressed, the N may be correspondingly adjusted. If the data programmed by the second operating mode in the physical unit operated by the second operating mode is compressed, N may also be correspondingly adjusted. Detailed description for adjusting N will be described below with reference to FIG. 10A to FIG. 10D.

Figure 10A:
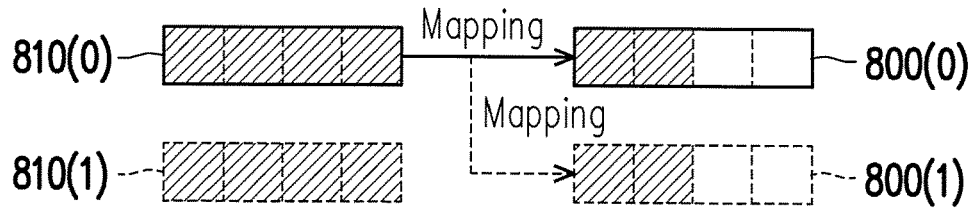
FIG. 10A to FIG. 10D are schematic diagrams illustrating a memory management method according to another exemplary embodiment of the disclosure.

In FIG. 10A, it is assumed herein that the memory management circuit 702 compresses the data of the logical unit 810(0) by using the 2 k resolution and writes the compressed data into one physical unit (e.g., the physical unit 800(0)) based on the first operating mode. Because a size of the compressed data is ½ size of the data before compression and the physical unit 800(0) operated based on the first operating mode can uses only ½ volume of its own, the compressed data can be written into all the lower physical programming units of the physical unit 800(0), as shown in FIG. 10A. When the data of the logical unit 810(0) is written into one physical unit based on the first operating mode while the data of the logical unit 810(0) is not compressed, such data thereof is stored into all the lower physical programming units of two physical units (e.g., stored into the lower physical programming units of the physical unit 800(1) and the physical unit 800(1)), and a mapping relation between the logical unit 810(0) and the physical unit 800(0) and a mapping relation between the logical unit 810(0) and the physical unit 800(1) are as shown by solid-line boxes and dot-line boxes in FIG. 10A. Therefore, in the case where the data compressed by using the 2 k resolution, one extra space including all the lower physical programming units of the physical unit 800(1) is provided as compared to the case where the data is not compressed, such that data of another logical unit (e.g., the logical unit 810(1)) can be compressed by using the 2 k resolution and written into the physical unit 800(1) based on the first operating mode. Therefore, after the data of the logical unit 810(0) is compressed by using the 2 k resolution and written into the physical unit 800(0) based on the first operating mode, the value of N does not change.

Figure 10B:
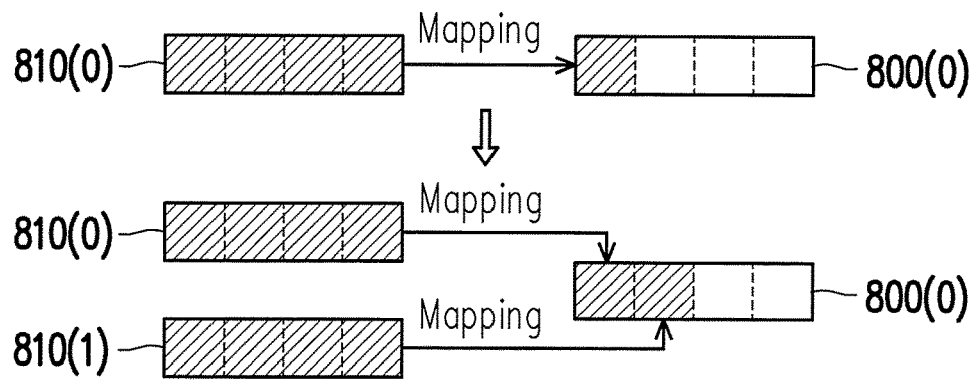

In FIG. 10B, it is assumed herein that the memory management circuit 702 compresses the data of the logical unit 810(0) by using the 1 k resolution and writes the compressed data into one physical unit (e.g., the physical unit 800(0)) based on the first operating mode. Because a size of the compressed data is ¼ size of the data before compression, the compressed data occupies ¼ volume of the physical unit 800(0), as shown in FIG. 10B. After the data of the logical unit 810(0) is compressed and written in the physical unit 800(0) based on the first operating mode, the physical unit 800(0) still has ¼ volume as available space left in the lower physical programming units, such that data of another logical unit (e.g., the logical unit 810(1)) can be compressed by using the 1 k resolution and written into the remaining space of the physical unit 800(0) based on the first operating mode as shown in FIG. 10B. Accordingly, the value of N is slightly increased.

Figure 10C:
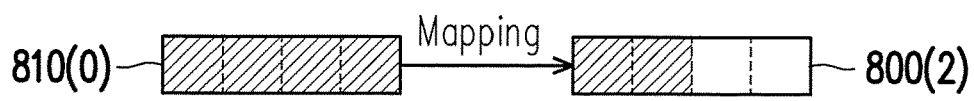

In FIG. 10C, it is assumed herein that the memory management circuit 702 compresses the data of the logical unit 810(0) by using the 2 k resolution and writes the compressed data into one physical unit (e.g., the physical unit 800(2)) based on the second operating mode. Because the data has been compressed into ½ the original size, after the data of the logical unit 810(0) are all written into the physical unit 800(2), the physical unit 800(2) still has ½ available volume left. Said available volume left can be further used to store data based on the first operating mode, such that the value of N is increased accordingly. However, the ½ volume of the physical unit 800(2) operated based on the second operating mode is equivalent to ¼ volume of the physical unit 800(2) operated based on the first operating mode (the number of bits stored by a memory cell of the physical unit operated based on the first operating mode (i.e., 1) is a half of the number of bits stored in a memory cell of the physical unit operated based on the second operating mode (i.e., 2)). Therefore, the value of N is adjusted into N plus ¼ volume of the physical unit 800(2).

It should be noted that, although the foregoing exemplary embodiment describes that ¼ volume of the physical unit 800(2) operated based on the first operating mode may be generated through the data compression. However, that does not mean the memory management circuit 702 will operate the volume not storing the valid data in the physical unit 800(2) based on the first operating mode, and that is to say, the same physical will not be operated based on different operating modes. For example, when data of two logical units are both compressed by the 2 k resolution and written into the same physical unit based on the second operating mode, another physical unit not yet storing the valid data may be operated by using the first operating mode.

Figure 10D:

In FIG. 10D, it is assumed herein that the memory management circuit 702 compresses the data of the logical unit 810(0) by using the 1 k resolution and writes the compressed data into one physical unit (e.g., the physical unit 800(2)) based on the second operating mode. Because the data has been compressed into ¼ the original size, then after the data of the logical unit 810(0) are all written into the physical unit 800(2), the physical unit 800(2) still has ¾ available volume left. Said available volume left can be used to store data based on the first operating mode, such that the value of N is increased accordingly. However, the ¾ volume of the physical unit 800(2) operated based on the second operating mode is equivalent to ⅜ volume of the physical unit 800(2) in the operation of the first operating mode (the number of bits stored by a memory cell of the physical unit operated based on the first operating mode (i.e., 1) is a half of the number of bits stored in the memory cell of the physical unit operated based on the second operating mode (i.e., 2)). Therefore, the value of N is adjusted into N plus ⅜ volume of the physical unit 800(2).

Figure 11:
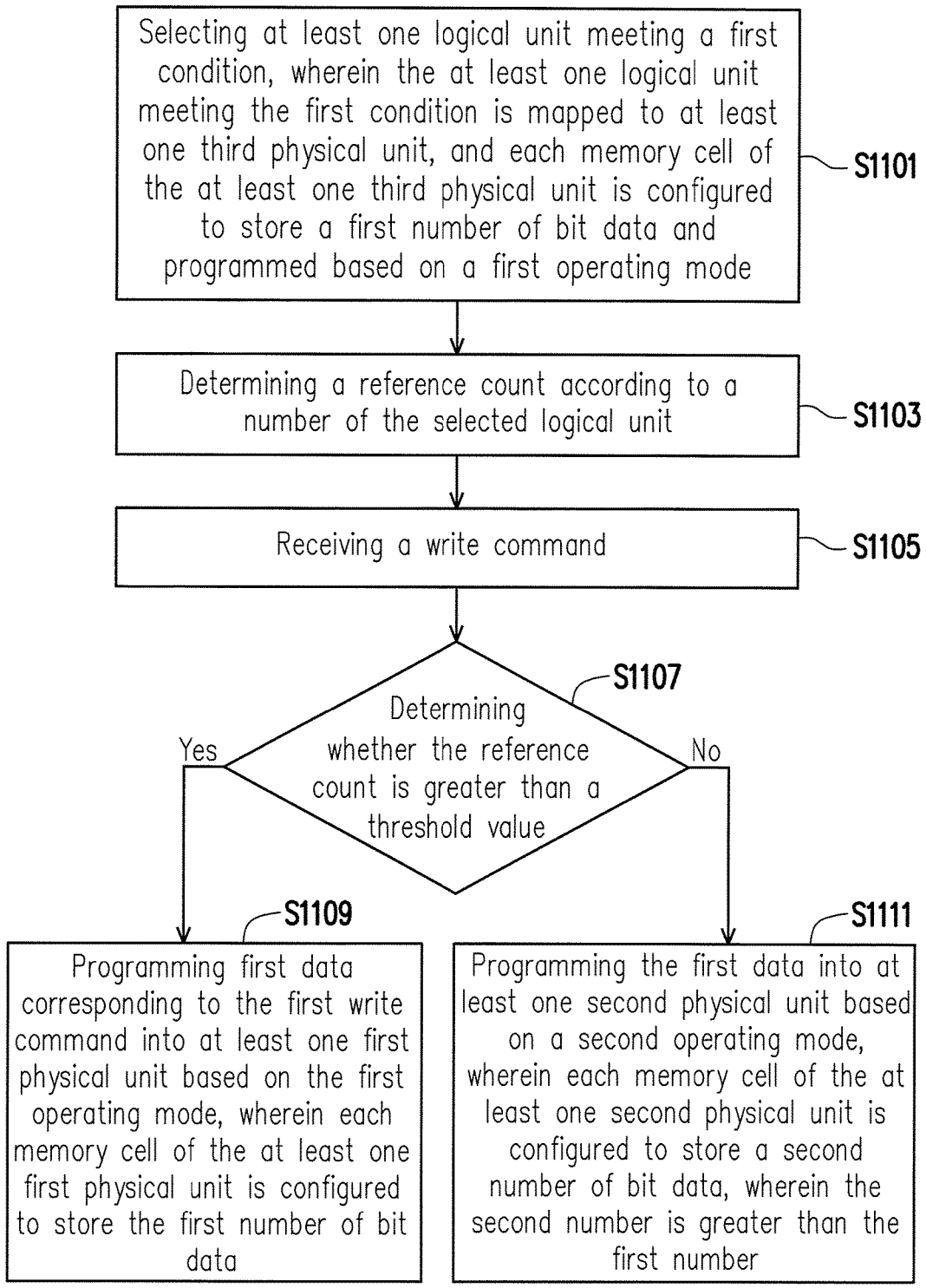
FIG. 11 is a flowchart illustrating a memory management method according to an exemplary embodiment of the disclosure.

FIG. 11 is a flowchart illustrating a memory management method according to an exemplary embodiment of the disclosure.

Referring to FIG. 11, in step S1101, at least one logical unit meeting a first condition is selected, wherein the at least one logical unit meeting the first condition is mapped to at least one third physical unit, and each memory cell of the at least one third physical unit is configured to store a first number of bit data and programmed based on a first operating mode. In step S1103, a reference count is determined according to a number of the selected logical unit. In step S1105, a first write command is received. In step S1107, whether the reference count is greater than a threshold value is determined. If the reference count is greater than the threshold value, in step S1109, first data corresponding to the first write command is programmed into at least one first physical unit based on the first operating mode, wherein each memory cell in the at least one first physical unit is configured to store the first number of bit data. If the reference count is not greater than the threshold value, in step S1111, the first data is programmed into at least one second physical unit based on a second operating mode, wherein each memory cell of the at least one second physical unit is configured to store a second number of bit data, wherein the second number is greater than the first number.

In summary, according to the memory management method, the memory control circuit unit and the memory storage device provided by the disclosure, the data to be stored is programmed into the physical units based on the first operating mode only when the reference count is greater than the threshold value. Accordingly, the problem of sudden dropping of the writing speed caused by the first operating mode overused to write the data into the physical unit may be reduced, and the data merging procedure may be optimized because of the reference count.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a rewritable non-volatile memory module having a plurality of physical units, and the memory management method comprising:
    selecting, by a flash memory controller, at least one logical unit meeting a first condition, wherein the at least one logical unit meeting the first condition is mapped to at least one third physical unit among the physical units, and each memory cell of the at least one third physical unit is configured to store a first number of bit data and programmed based on a first operating mode;
    determining, by the flash memory controller, a reference count according to a number of the selected logical unit, wherein the reference count reflects a logical data volume corresponding to the selected logical unit;
    receiving, by the flash memory controller, a first write command;
    determining, by the flash memory controller, whether the reference count is greater than a threshold value;
    programming, by the flash memory controller, first data corresponding to the first write command into at least one first physical unit among the physical units based on the first operating mode if the reference count is greater than the threshold value, wherein each memory cell in the at least one first physical unit is configured to store the first number of bit data;
    programming, by the flash memory controller, the first data into at least one second physical unit among the physical units based on a second operating mode if the reference count is not greater than the threshold value, wherein each memory cell in the at least one second physical unit is configured to store a second number of bit data,
    wherein the second number is greater than the first number;
    determining, by the flash memory controller, whether second data is to be programmed based on the first operating mode or the second operating mode;
    adjusting, by the flash memory controller, the reference count in response to that the second data is to be programmed based on the second operating mode and a compression resolution of the second data is a first resolution; and
    not adjusting, by the flash memory controller, the reference count in response to that the second data is to be programmed based on the first operating mode and the compression resolution of the second data is the first resolution.

2. The memory management method of claim 1, further comprising:
    determining an initial value of the reference count according to a difference value between a total logical volume of a plurality of logical units being configured and a total physical volume of the physical units.

3. The memory management method of claim 1, wherein data stored in each of the at least one third physical unit is valid data.

4. The memory management method of claim 1, wherein the reference count is negatively correlated to a data volume of valid data programmed based on the first operating mode in the rewritable non-volatile memory module.

5. The memory management method of claim 1, wherein the reference count is negatively correlated to the number of the at least one logical unit.

6. The memory management method of claim 1, further comprising:

performing a data merging procedure to adjust the reference count from a first value into a second value, wherein the second value is greater than the first value, wherein the data merging procedure comprises:
selecting valid data programmed based on the first operating mode from the physical units for performing the data merging procedure; and
erasing at least one physical unit storing invalid data among the physical units.

7. The memory management method of claim 1, further comprising:
if data programmed by the second operating mode in the physical units is compressed, adjusting the reference count.

8. A memory control circuit unit, configured to control a rewritable non-volatile memory module, and the memory control circuit unit comprising:
a host interface, configured to couple to a host system;
a memory interface, configured to couple to the rewritable non-volatile memory module comprising a plurality of physical units; and
a flash memory management circuit, coupled to the host interface and the memory interface,
wherein the flash memory management circuit is configured to select at least one logical unit meeting a first condition, wherein the at least one logical unit meeting the first condition is mapped to at least one third physical unit among the physical units, and each memory cell of the at least one third physical unit is configured to store a first number of bit data and programmed based on a first operating mode,
wherein the flash memory management circuit is further configured to determine a reference count according to a number of the selected logical unit, wherein the reference count reflects a logical data volume corresponding to the selected logical unit,
wherein the flash memory management circuit is further configured to receive a first write command,
wherein the flash memory management circuit is further configured to determine whether the reference count is greater than a threshold value,
if the reference count is greater than the threshold value, the flash memory management circuit is further configured to instruct to program first data corresponding to the first write command into at least one first physical unit among the physical units based on the first operating mode, wherein each memory cell in the at least one first physical unit is configured to store the first number of bit data,
if the reference count is not greater than the threshold value, the flash memory management circuit is further configured to instruct to program the first data into at least one second physical unit among the physical units based on a second operating mode, wherein each memory cell in the at least one second physical unit is configured to store a second number of bit data,
wherein the second number is greater than the first number,
the flash memory management circuit is further configured to determine, whether second data is to be programmed based on the first operating mode or the second operating mode,
the flash memory management circuit is further configured to adjust the reference count in response to that the second data is to be programmed based on the second operating mode and a compression resolution of the second data is a first resolution, and
the flash memory management circuit is further configured not to adjust the reference count in response to that the second data is to be programmed based on the first operating mode and the compression resolution of the second data is the first resolution.

9. The memory control circuit unit of claim 8, wherein the flash memory management circuit is further configured to determine an initial value of the reference count according to a difference value between a total logical volume of a plurality of logical units being configured and a total physical volume of the physical units.

10. The memory control circuit unit of claim 8, wherein data stored in each of the at least one third physical unit is valid data.

11. The memory control circuit unit of claim 8, wherein the reference count is negatively correlated to a data volume of valid data programmed based on the first operating mode in the rewritable non-volatile memory module.

12. The memory control circuit unit of claim 8, wherein the reference count is negatively correlated to the number of the at least one logical unit.

13. The memory control circuit unit of claim 8, wherein the flash memory management circuit is further configured to instruct performing a data merging procedure to adjust the reference count from a first value into a second value, wherein the second value is greater than the first value,
wherein the data merging procedure comprises:
selecting valid data programmed based on the first operating mode from the physical units for performing the data merging procedure; and
erasing at least one physical unit storing invalid data among the physical units.

14. The memory control circuit unit of claim 8, wherein the flash memory management circuit is further configured to adjust the reference count if data programmed based on the second operating mode in the physical units is compressed.

15. A memory storage device, comprising:
a connection interface unit, configured to couple to a host system;
a rewritable non-volatile memory module comprising a plurality of physical units; and
a flash memory control circuit unit, coupled to the connection interface unit and the rewritable non-volatile memory module,
wherein the flash memory control circuit unit is configured to select at least one logical unit meeting a first condition, wherein the at least one logical unit meeting the first condition is mapped to at least one third physical unit among the physical units, and each memory cell of the at least one third physical unit is configured to store a first number of bit data and programmed based on a first operating mode,
wherein the flash memory control circuit unit is further configured to determine a reference count according to a number of the selected logical unit, wherein the reference count reflects a logical data volume corresponding to the selected logical unit,
wherein the flash memory control circuit unit is further configured to receive a first write command,
wherein the flash memory control circuit unit is further configured to determine whether the reference count is greater than a threshold value,
if the reference count is greater than the threshold value, the flash memory control circuit unit is further configured to instruct to program first data corresponding to the first write command into at least one first physical unit among the physical units based on the first operating mode, wherein each memory cell in the at least one first physical unit is configured to store the first number of bit data, if the reference count is not greater than the threshold value, the flash memory control circuit unit is further configured to instruct to program the first data into at least one second physical unit among the physical units based on a second operating mode, wherein each memory cell in the at least one second physical unit is configured to store a second number of bit data, wherein the second number is greater than the first number, the flash memory control circuit unit is further configured to determine, whether second data is to be programmed based on the first operating mode or the second operating mode, the flash memory control circuit unit is further configured to adjust the reference count in response to that the second data is to be programmed based on the second operating mode and a compression resolution of the second data is a first resolution, and the flash memory control circuit unit is further configured not to adjust the reference count in response to that the second data is to be programmed based on the first operating mode and the compression resolution of the second data is the first resolution.

16. The memory storage device of claim 15, wherein the flash memory control circuit unit is further configured to determine an initial value of the reference count according to a difference value between a total logical volume of a plurality of logical units being configured and a total physical volume of the physical units.

17. The memory storage device of claim 15, wherein data stored in each of the at least one third physical unit is valid data.

18. The memory storage device of claim 15, wherein the reference count is negatively correlated to a data volume of valid data programmed based on the first operating mode in the rewritable non-volatile memory module.

19. The memory storage device of claim 15, wherein the reference count is negatively correlated to the amount of the at least one logical unit.

20. The memory storage device of claim 15, wherein the flash memory control circuit unit is configured to instruct performing a data merging procedure to adjust the reference count from a first value into a second value, wherein the second value is greater than the first value, wherein the data merging procedure comprises:

selecting valid data programmed based on the first operating mode from the physical units for the data merging procedure; and erasing at least one physical unit storing invalid data among the physical units.

21. The memory storage device of claim 15, wherein if data programmed based on the second operating mode in the physical units is compressed, the flash memory control circuit unit adjusts the reference count.

* * * * *